(12) United States Patent
Tanno

(10) Patent No.: US 7,810,534 B2
(45) Date of Patent: Oct. 12, 2010

(54) PNEUMATIC TIRE

(75) Inventor: Atsushi Tanno, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 290 days.

(21) Appl. No.: 10/551,099

(22) PCT Filed: Apr. 5, 2004

(86) PCT No.: PCT/JP2004/004902

§ 371 (c)(1),
(2), (4) Date: Sep. 28, 2005

(87) PCT Pub. No.: WO2004/089656

PCT Pub. Date: Oct. 21, 2004

(65) Prior Publication Data

US 2006/0213596 A1    Sep. 28, 2006

(30) Foreign Application Priority Data

Apr. 4, 2003   (JP) .............................. 2003-101004

(51) Int. Cl.
*B60C 1/00* (2006.01)
*B60C 9/18* (2006.01)
*B60C 9/22* (2006.01)
*B60C 9/28* (2006.01)

(52) U.S. Cl. ................. 152/526; 152/531; 152/532; 152/535; 152/537; 152/538

(58) Field of Classification Search ............. 152/526, 152/531, 532, 533, 534, 535, 536, 537, 538
See application file for complete search history.

(56) References Cited

U.S. PATENT DOCUMENTS

| | | | | |
|---|---|---|---|---|
| 4,444,236 A | * | 4/1984 | Kan et al. | 152/209.5 |
| 5,215,612 A | * | 6/1993 | Motomura et al. | 156/130.7 |
| 5,394,919 A | * | 3/1995 | Sandstrom et al. | 152/537 |
| 5,695,578 A | * | 12/1997 | Boiocchi et al. | 152/458 |

FOREIGN PATENT DOCUMENTS

DE           19649507       *   4/1998

(Continued)

OTHER PUBLICATIONS

Machine translation of JP 6-344721, 1994.*
International Search Report.

*Primary Examiner*—Justin Fischer
(74) *Attorney, Agent, or Firm*—Greer, Burns & Crain, Ltd.

(57) ABSTRACT

A pneumatic tire having at least two belt plies provided radially outwardly of a carcass ply in the tread. A belt cover ply is disposed radially outwardly of the at least two belt plies. The belt cover ply has reinforcing cords that extend in the circumferential direction of the tire and is covered with coating rubber. The belt cover ply extends beyond the edges of one of the at least two belt plies having a maximum belt width to have extension portions that extend at least 10 mm axially of the tire therefrom. The coating rubber of at least the extension portions of the belt cover ply is formed of rubber having a tan delta at a temperature of 60.degree. C. that is equal to or less than 0.1, and the ratio h/SH of a tire radial-direction length h between the edges of the extension portions and the edges of the belt ply having the maximum belt width to the tire section height SH is equal to or less than 1.5/100.

10 Claims, 3 Drawing Sheets

FOREIGN PATENT DOCUMENTS

| | | | |
|---|---|---|---|
| JP | 58167203 | * | 10/1983 |
| JP | 02-028003 | | 1/1990 |
| JP | 02074403 | * | 3/1990 |
| JP | 05-147405 | | 6/1993 |
| JP | 06092108 | * | 4/1994 |
| JP | P 6-344721 | * | 12/1994 |
| JP | 07257116 | * | 10/1995 |
| JP | 11-034610 | | 2/1999 |
| JP | 2001-163009 | | 6/2001 |
| JP | 2001-310604 | * | 6/2001 |
| JP | 2001-180225 | | 7/2001 |
| WO | WO 02/26878 | * | 4/2002 |

* cited by examiner

PNEUMATIC TIRE

The present application claims priority based on Japanese Patent Application No. 2003-101004, filed Apr. 4, 2003, the entirety of which is incorporated herein by reference.

TECHNICAL FIELD

The present invention relates to pneumatic tires, and more particularly, to a pneumatic tire which can improve rolling resistance and uniformity.

TECHNICAL BACKGROUND

Conventionally, to improve high speed durability and road noise, pneumatic tires are disclosed in, for example, Unexamined Japanese Patent Application Publication Nos. 11-34610 and 2001-180225, having a belt cover ply disposed radially outwardly of the belt plies, the belt cover ply extending beyond the edges of the belt plies. The belt cover ply has such extension portions, thereby increasing a hoop effect in the shoulder portions, resulting in that high speed durability is improved and road noise is reduced.

However, when the extension portions extend 10 mm or greater in the axial direction of the tire to further increase the above effect by the belt cover ply, an increase in the amount of heat generated in the shoulder portions, due to repeated deformation received during rolling of the tire, increases a loss in energy, thereby encountering a problem of deteriorating rolling resistance.

Also, the extension portions of 10 mm or greater depend radially inward from the edges of the belt plies when a green tire is formed. As a result, the difference between the circumferential lengths of the center side and extension portions of the belt cover ply is larger, so that wrinkles are created in the extension portions when the green tire is molded during curing; the wrinkling becomes one of the causes that degrade uniformity of a cured tire.

DISCLOSURE OF THE INVENTION

An object of the present invention is to provide a pneumatic tire having a belt cover ply which extends 10 mm or greater from the edges of a belt ply, in which rolling resistance and uniformity can be improved.

In order to achieve the above object, a pneumatic tire according to the present invention includes a carcass ply extending between beads, at least two belt plies being provided radially outwardly of the carcass ply in a tread, the at least two belt plies having reinforcing cords arranged obliquely with respect to a circumferential direction of the tire, a belt cover ply being disposed radially outwardly of the at least two belt plies, the belt cover ply having a reinforcing cord that extends in the circumferential direction of the tire and is covered with coating rubber, the belt cover ply extending beyond edges of one of the at least two belt plies having a maximum belt width to have extension portions that extend at least 10 mm axially of the tire therefrom, wherein the coating rubber of at least the extension portions of the belt cover ply is formed of rubber having a tan delta at a temperature of 60° C. that is equal to or less than 0.1, and a ratio h/SH of a tire radial-direction length h between edges of the extension portions and the edges of the belt ply having the maximum belt width to a tire section height SH is equal to or less than 1.5/100.

As described above, the coating rubber of the extension portions of the belt cover ply is formed of rubber having a tan delta at a temperature of 60° C. that is equal to or less than 0.1, and the tire radial-direction length h between the edges of the extension portions and belt ply having a maximum belt width is small as mentioned above, thereby moderating heat generated in the shoulder portions by deformation repeatedly received during rolling of the tire; a loss in energy can, therefore, be reduced, and rolling resistance can be improved.

The ratio h/SH is specified as mentioned above, thereby decreasing the difference between the circumferential lengths of the center side and extension portions of the belt cover ply, resulting in that wrinkles can be inhibited from being created in the extension portions during molding of a green tire. Therefore, in a tire provided with a belt cover ply having extension portions that are 10 mm or greater in length, uniformity can be improved.

Another pneumatic tire according to the present invention includes a carcass ply extending between beads, at least two belt plies being provided radially outwardly of the carcass ply in a tread, the at least two belt plies having reinforcing cords arranged obliquely with respect to a circumferential direction of the tire, a belt cover ply covering the at least two belt plies, the belt cover ply having a main belt cover section disposed radially outwardly of the at least two belt plies and a belt cover extension section disposed on each side of the main belt cover section, the main belt cover section having a reinforcing cord that extends in the circumferential direction of the tire and is covered with coating rubber, the belt cover extension sections extending beyond edges of one of the at least two belt plies having a maximum belt width, the belt cover extension sections extending at least 10 mm axially of the tire therefrom, the belt cover extension sections having reinforcing cords that extend in the circumferential direction of the tire and are covered with coating rubber, wherein the coating rubber of at least the belt cover extension sections of the belt cover ply is formed of rubber having a tan delta at a temperature of 60° C. that is equal to or less than 0.1, and a ratio h/SH of a tire radial-direction length h between outer edges of the belt cover extension sections and the edges of the belt ply having the maximum belt width to a tire section height SH is equal to or less than 1.5/100.

As described above, the belt cover ply comprises a main belt cover section and belt cover extension sections, and the belt cover extension sections are formed in the same manner as the extension portions described above, thereby allowing for improvement in rolling resistance and uniformity while keeping the advantages of improving high speed durability and road noise.

BEST MODES FOR CARRYING OUT THE INVENTION

Embodiments of the present invention will be described in detail below with reference to the attached drawings.

Figure 1:
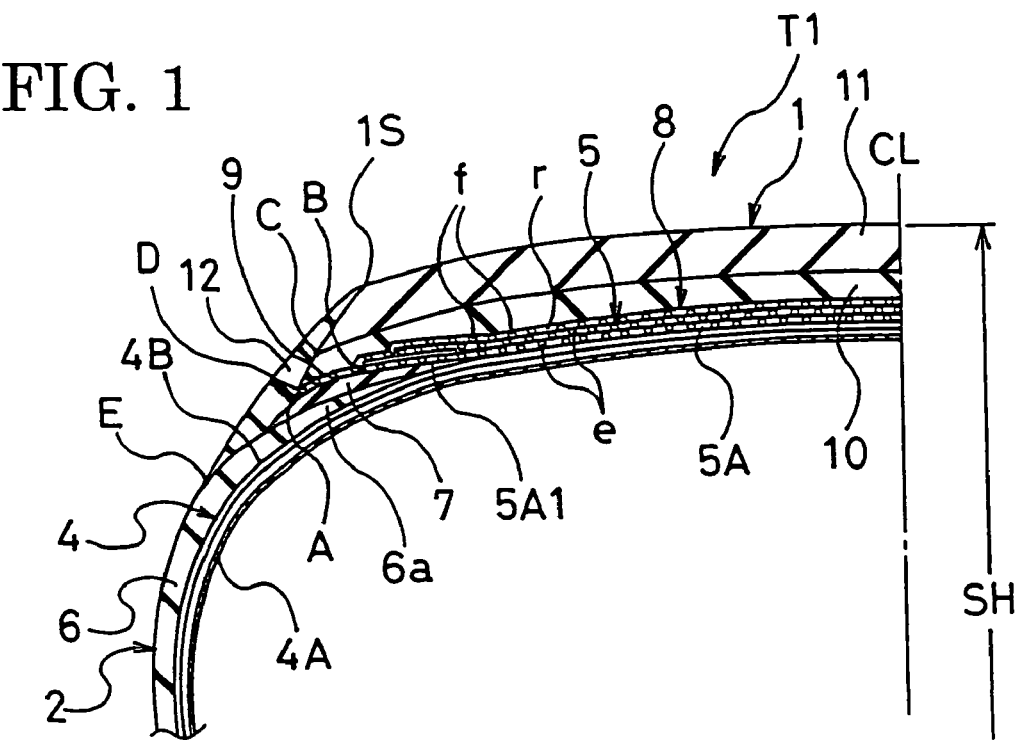
FIG. 1 is a cross-sectional view showing the main part of an embodiment of a pneumatic tire according to the present invention, taken in a plane that contains the axis of rotation of the tire.
Figure 2:
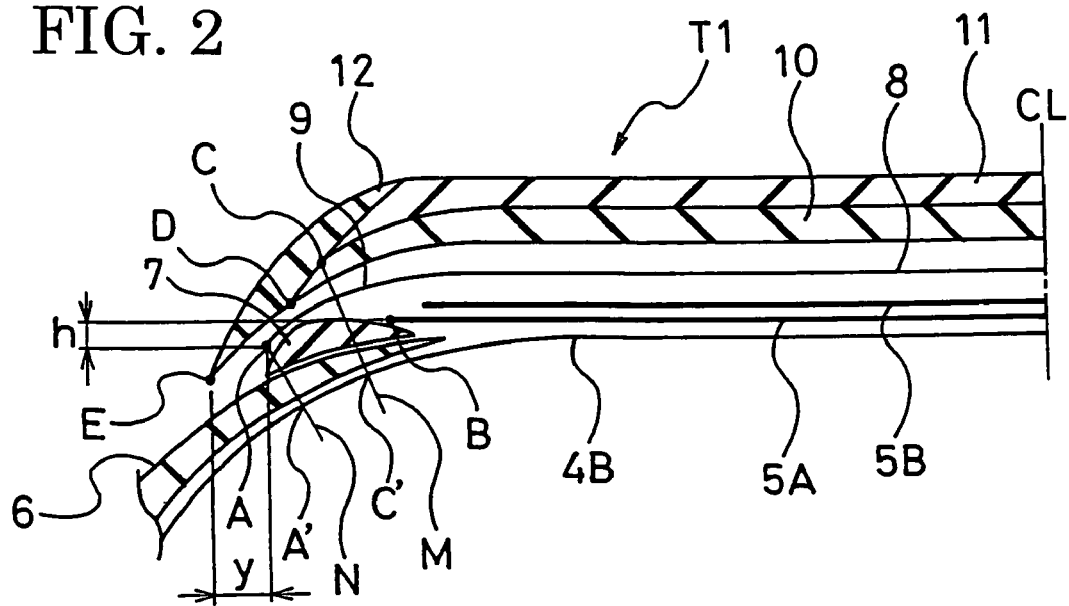
FIG. 2 is a schematic illustration of FIG. 1.

Referring to FIGS. 1 and 2, there is shown an embodiment of a pneumatic tire according to the present invention, in which reference character T1 denotes a pneumatic tire, reference numeral 1 denotes a tread, reference numeral 2 denotes a sidewall, and reference character CL denotes a tire centerline.

Carcass plies 4 comprising an inner carcass ply 4A and an outer carcass ply 4B extend between the left and right beads (not shown), and the both end portions thereof are folded from the inner side of the tire toward the outer side thereof about the bead cores (not shown) embedded in the beads.

Provided radially outwardly of the carcass plies 4 in the tread 1 are two belt plies which has reinforcing cords e arranged obliquely with respect to the circumferential direction of the tire. The two belt plies 5 consist of a first belt ply 5A which is adjacent the carcass plies 4 and has a wide belt width, and a second belt ply 5B which is disposed on the first belt ply 5A and has a belt width smaller than the first belt ply 5A.

A side rubber layer 6 is disposed outwardly of the carcass plies in each sidewall 2. The side rubber layers 6 have radially outer end portions 6a extending to the radially inner sides of the edge portions 5A1 of the first belt ply 5A.

Belt edge cushion rubber layers 7, which are substantially triangular in cross section, are disposed radially inwardly of the belt plies 5. The belt edge cushion rubber layers 7 are positioned between the radially outer portions 6a of the side rubber layers. 6 and the edge portions 5A1 of the first belt ply 5A, and extend outwardly of the tire beyond the edge portions of the belt plies 5.

Provided radially outwardly of the belt plies 5 is a belt cover ply 8 having reinforcing cords f formed from an organic fiber cord such as a nylon cord. The reinforcing cords f, which extend in the circumferential direction of the tire, are arranged in the widthwise direction of the tire, and covered with coating rubber r. The belt cover ply 8 extends beyond the edges B of the first belt ply 5A and has extension portions 9 which extend at least 10 mm (length measured parallel to the axial direction of the tire) therefrom in the axial direction of the tire. The extension portions 9 are disposed on the belt edge cushion rubber layers 7. The coating rubber r located in at least the extension portions 9 of the belt cover ply 8 is formed of rubber having a tan delta at a temperature of 60° C. that is equal to or less than 0.1.

Figure 3A:
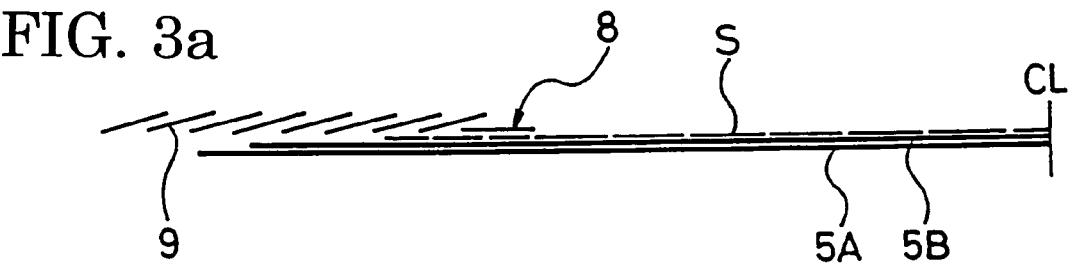
FIG. 3a is a cross-sectional illustration showing one example of the belt cover ply formed using strip members.
Figure 3B:
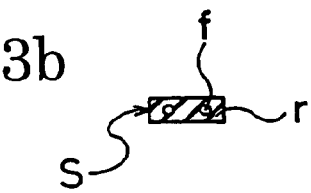
FIG. 3b is a cross-sectional view showing one example of the strip members used for the belt cover ply.

As shown in FIGS. 3a and 3b, the belt cover ply 8 is preferably formed from strip members S having reinforcing cords f covered with coating rubber r, the strip members being spirally wound in the circumferential direction of the tire. In the example shown in the drawings, a strip member S is spirally and adjacently wound in the circumferential direction of the tire in the center side of the belt cover ply 8, so that one edge of the strip member is butted against the other edge thereof to have a one-layer structure; in each of the regions from the parts of the belt cover ply 8 adjacent the edge portions of the belt plies 5 to the extension portions 9, a strip member S is adjacently wound, so that the strip member S is partially superposed in such a manner that one half portion thereof in the widthwise direction overlaps the other half portion thereof to form two layers. In FIG. 3a, for ease of seeing the drawing, the strip member S adjacently wound in the center side of the belt cover ply 8 is drawn so that one edge thereof is away from the other edge thereof, but they are actually in contact with each other.

When the belt cover ply 8 is made up of strip members S, it is preferable in terms of easy formation of the belt cover ply 8 that at least each extension portion 9 be formed such that the adjacently wound strip member S is partially superposed. The extension portions 9 made up of the strip members S which are partially superposed can suppress the shoulder portions 1S from moving; therefore, heat generated therein is inhibited, thereby contributing to further improvement of rolling resistance.

An under tread rubber layer 10 is placed radially outwardly of the belt cover ply 8, and a cap tread rubber layer 11 is disposed radially outwardly of the under tread rubber layer 10. A wing chip rubber layer 12 is placed in each shoulder portion 1S so as to cover the edges D, C and A of the under tread rubber layer 10, cap tread rubber layer 11 and extension portion 9.

The ratio h/SH of a tire radial-direction length h, measured parallel to the radial direction of the tire, between the edges A of the extension portions 9 of the belt cover ply 8 and the edges B of the first belt ply 5A to a tire section height SH is expressed by h/SH≦1.5/100. The tire section height SH referred in the present invention is measured as follows. A pneumatic tire is seated on an applicable rim defined by JATMA, and the outer radius of the tire is measured with the maximum air pressure (air pressure corresponding to the maximum load ability) applied thereto. A numeric value obtained by dividing a value given by subtracting the outer radius value of the rim from the measured tire outer radius value by 2 is the tire section height. When it is a pneumatic tire for passenger cars, the air pressure is 200 kPa.

According to the present invention described above, the coating rubber r of the extension portions 9 of the belt cover ply 8 is formed of rubber having a tan delta at a temperature of 60° C. that is equal to or less than 0.1, and the tire radial-direction length h between the edges A of the extension portions 9 and the edges B of the first belt ply 5A is small as described above, thereby moderating heat generated in the shoulder portions 1S by deformation repeatedly received during rolling of the tire, and reducing a loss in energy; therefore, rolling resistance can be improved.

The ratio h/SH is specified as mentioned above, thereby decreasing the difference between the circumferential lengths of the center side and extension portions 9 of the belt cover ply 8, resulting in that wrinkles can be inhibited from being created in the extension portions 9 during molding of a green tire. The tire T1 provided with the belt cover ply 8 having extension portions 9 which are 10 mm or more in length can, therefore, improve uniformity.

If the tan delta exceeds 0.1, it is difficult to improve rolling resistance because heat generated in the shoulder portions 1S can not be suppresses. Preferably, the tan delta is equal to or less than 0.05. The lower limit of the tan delta is desirably 0.01 or greater from the viewpoint of compatibility between strength and durability.

If the ratio h/SH is greater than 1.5/100, uniformity can not be improved. The ratio h/SH is preferably equal to or less than 1.0/100, and more preferably equal to 0.

Figure 4:
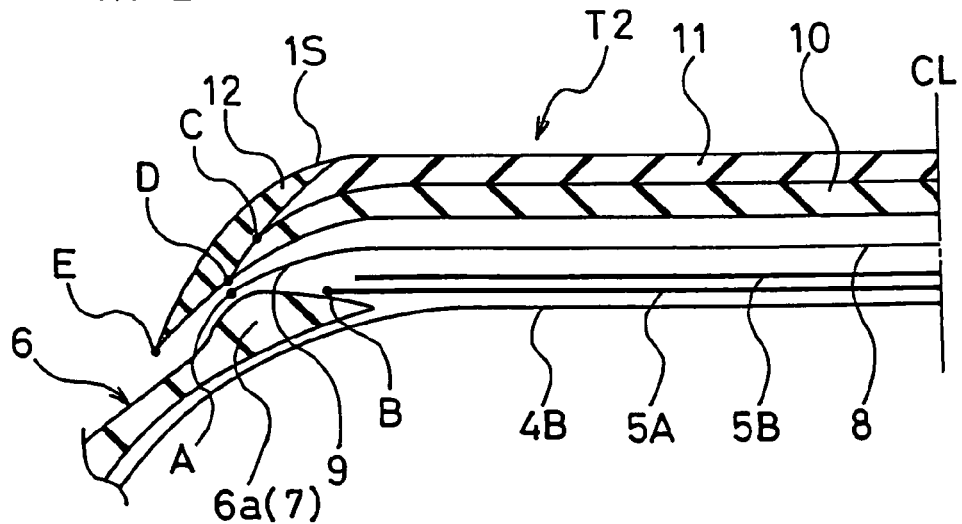
FIG. 4 is a schematic illustration showing the main part of an alternative embodiment of a pneumatic tire according to the present invention.

Referring to FIG. 4, there is shown an alternative embodiment of a pneumatic tire according to the present invention. This pneumatic tire T2 is arranged such that, instead of the belt edge cushion rubber layers 7, the radially outer end portion 6a of each side rubber layer 6 is formed to be substantially triangular in cross-sectional shape as a belt edge cushion rubber portion in the pneumatic tire T1 described above. The extension portions 9 are disposed on the belt edge cushion rubber portions. The pneumatic tire of the present invention may be one with this construction. It is to be noted that other structures thereof are the same as those of the pneumatic tire T1 in FIGS. 1 and 2, and like elements are referred by the like reference characters and description thereof will be omitted.

Figure 5:
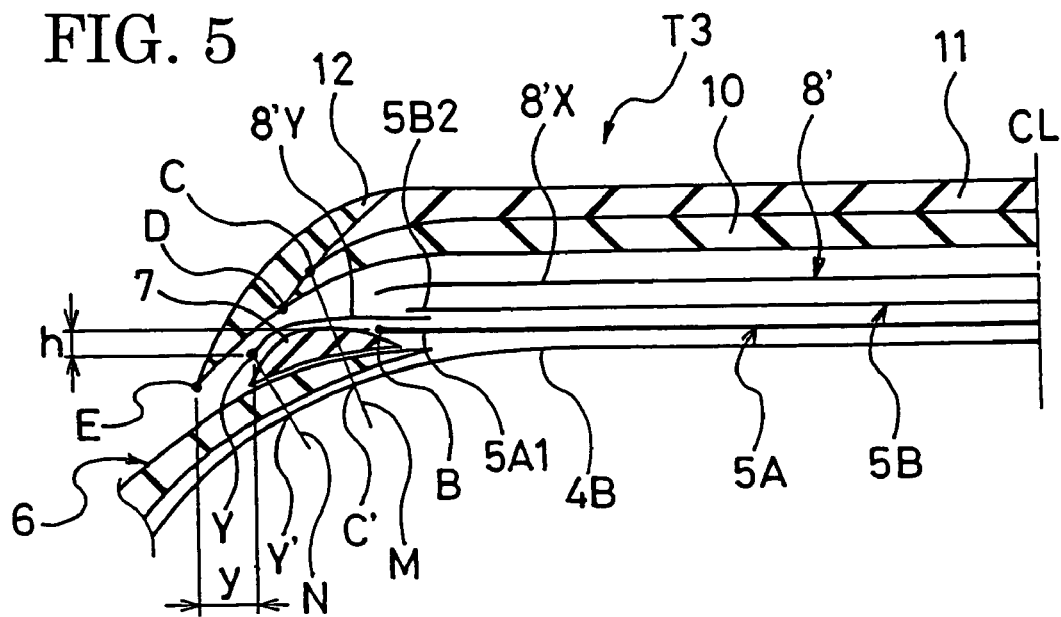
FIG. 5 is a schematic illustration showing the main part of another alternative embodiment of a pneumatic tire according to the present invention.

Referring to FIG. 5, there is shown another alternative embodiment of a pneumatic tire according to the present invention. This pneumatic tire T3 has a belt cover ply 8' covering the belt plies 5, the belt cover ply 8' comprising main belt cover section 8'X disposed radially outwardly of the belt plies 5 and a belt cover extension sections 8'Y disposed on either side of the main belt cover section 8'X. The main belt cover section 8'X and belt cover extension sections 8'Y are structured such that their reinforcing cords which extend in the circumferential direction of the tire are arranged in the widthwise direction of the tire and covered with coating rubber in the same manner as the belt cover ply 8 of the pneumatic tire T1.

The belt cover extension sections 8'Y are located at positions between the edge portions 5A1 and 5B1 of the first belt ply 5A and second belt ply 5B and extend outwardly in the widthwise direction of the tire beyond the edges B of the first belt ply 5A. The belt cover extension sections 8'Y extend at least 10 mm (a length measured parallel to the axial direction of the tire) outwardly in the widthwise direction of the tire from the edges B of the first belt ply 5A, and the portions thereof extending from the edges B of the first belt ply 5A are disposed on the belt edge cushion rubber layers 7.

This pneumatic tire may be structured such that, instead of the belt edge cushion rubber layers 7, the radially outer end portions 6a of the side rubber layers 6 are formed as belt edge cushion rubber parts which are substantially triangular in cross-sectional shape as shown in FIG. 4 and the portions of the belt cover extension sections 8'Y extending from the edges B of the first belt ply 5A are disposed on the belt edge cushion rubber parts.

In the belt cover ply 8', at least the coating rubber of the belt cover extension sections 8'Y is formed of rubber having a tan delta at a temperature of 60° C. that is equal to or less than 0.1. The ratio h/SH of the tire radial-direction length h, measured parallel to the radial direction of the tire, between the outer edges Y of the belt cover extension sections 8'Y and the edges B of the first belt ply 5A to the tire section height SH is expressed by h/SH≦1.5/100.

The belt cover ply 8' is also preferably formed from strip members S, as shown in FIG. 3, having reinforcing cords f covered with coating rubber r, the strip members being spirally wound in the circumferential direction of the tire. When the belt cover ply 8' is made up of the strip members S, it is preferable that at least each belt cover extension section 8'Y be formed so as to adjacently wind a strip member S in a partially superposed manner.

As other structures thereof are the same as those of the pneumatic tire T1 in FIGS. 1 and 2, like elements are referred by the like reference characters and description thereof will be omitted.

In the pneumatic tire T3 having a belt cover ply 8' comprising a main belt cover section 8' X and belt cover extension sections 8'Y as described above also, the belt cover extension sections 8'Y are formed in the same manner as the extension portions 9 described above, thereby allowing for improvement in rolling resistance and uniformity while keeping the advantages of improving high speed durability and road noise.

Figure 6:
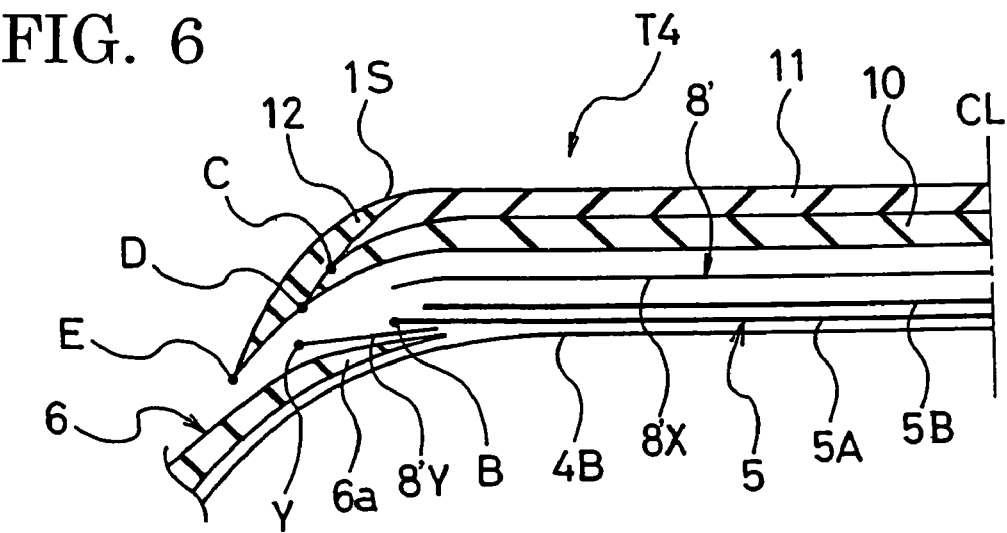
FIG. 6 is a schematic illustration showing the main part of still another alternative embodiment of a pneumatic tire according to the present invention.

Referring to FIG. 6, there is shown still another alternative embodiment of a pneumatic tire according to the present invention. This pneumatic tire T4 is arranged such that the above belt cover extension sections 8'Y are disposed between the edge portions 5A1 of the first belt ply 5A and the radially outer end portions 6a of the side rubber layers 6 on the carcass plies 4. The belt edge cushion rubber layers 7 are not provided, and the belt cover extension sections 8'Y are located on the side rubber layers 6.

As other structures thereof are the same as those of the pneumatic tire T3 in FIG. 5, like elements are referred by the like reference characters and description thereof will be omitted. The pneumatic tire of the present invention may be one with this construction.

In the present invention, rubber having a tan delta at a temperature of 60° C. that is 25% lower or more than that of the rubber constituting the cap tread rubber layer 11 is preferably used as the rubber constituting the belt edge cushion rubber layers 7, under tread rubber layer 10 and wing chip rubber layers 12. It is preferable in terms of further improvement in rolling resistance that the tan delta at a temperature of 60° C. of the rubber used therefor be equal to or less than 0.15. More preferably, the tan delta is equal to or less than 0.10. The lower limit of the tan delta is desirably 0.01 from the viewpoint of compatibility between strength and durability.

When the radially outer end portions 6a of the side rubber layers 6 are formed as belt edge cushion rubber parts which are substantially triangularly shaped in cross section, as shown in FIG. 4, rubber that is the same as that of the belt edge cushion rubber layers 7 mentioned above is preferably used for the rubber of the belt edge cushion rubber parts.

With reference to the relationship between the edges C of the cap tread rubber layer 11 and the edges A of the extension portions 9, as shown in FIG. 2, an intersection C' of a normal line M drawn to the outer carcass ply 4B from the edge C of the cap tread rubber layer 11 with the outer carcass ply 4B is preferably located inwardly of an intersection A' of a normal line N drawn to the outer carcass ply 4B from the edge A of the extension portion 9 with the outer carcass ply 4B in the tire widthwise direction in terms of further improvement in rolling resistance.

The same goes for the relationship between the edges C of the cap tread rubber layer 11 and the outer edges Y of the belt cover extension sections 8'Y shown in FIGS. 5 and 6. In FIGS. 5 and 6, reference character Y' is assigned to the intersection between a normal line N drawn to the outer carcass ply 4B from the outer edge Y of the belt cover extension section 8'Y with the outer carcass ply 4B, and the intersection C' is located inwardly of the intersection Y' in the tire widthwise direction.

Referring to the relationship between the radially inner edges E of the wing chip rubber layers 12 and the edges A of the extension portions 9, the length y between the radially inner edges E and the edges A, measured parallel to the axial direction of the tire, is preferably 10 mm or greater, so that the edges A are 10 mm or greater away from the radially inner edges E in the tire axial direction, suppressing wrinkles from occurring in the extension portions 9 during molding of a green tire and improving uniformity. More preferably, the length y is 15 mm or greater. The upper limit of the length y is not limited if the length of the extension portions 9 is 10 mm or greater.

The relationship between the outer edges Y of the belt cover extension sections 8'Y and the radially inner edges E of the wing chip rubber layers 12 is preferably the same as the relationship between the edges A of the extension portions 9 and the radially inner edges E of the wing chip rubber layers 12 described above.

The upper limit of the length of the extension portions 9 or the length of the parts of the belt cover extension sections 8'Y that extend beyond the edges B of the first belt ply 5 is defined by the relationship to the radially inner edges E of the wing chip rubber layers 12; in the case where a tire has a construction without wing chip rubber layers 12, the under tread rubber layer 10 and the cap tread rubber layer 11 extend to the positions of the wing chip rubber layers 12, and the relationship between the edges D of the under tread rubber layer 10 and the edges A of the extension portions 9 or the outer edges Y of the belt cover extension section 8'Y is the same as that of the case with the radially inner edges E described above.

The embodiments of FIGS. 1 and 4 show examples each having one belt cover ply 8; however, a plurality of belt cover plies may be provided as necessary. The same goes for the belt cover ply 8' in the embodiments of FIGS. 5 and 6.

A belt cover ply for covering only the edge portions of the belt plies 5 may be further provided radially outwardly of the edge portions of the belt plies 5.

There are shown examples of the cases where two belt plies 5 are provided; however, the pneumatic tire of the invention maybe a pneumatic tire in which two or more belt plies are disposed, and may be a pneumatic tire having at least two belt plies 5A and 5B. In the case where two or more belt plies are provided, the extension portions 9 or belt cover extension sections 8'Y extend at least 10 mm outwardly in the axial direction of the tire from the edges of one of the belt plies having a maximum belt width.

In the present invention, the tan delta at a temperature of 60° C. is measured under conditions of an initial strain of 10±2%, frequency of 20 Hz, and an atmospheric temperature of 60° C., using a visco-elastic spectrometer made by TOYO SEIKI SEISAKUSYO CO. Ld.

The present invention is preferably applicable to particularly a pneumatic tire for passenger cars, but is not limited thereto.

EXAMPLE 1

Prepared were test tires according to the present invention tire 1, comparison tires 1 and 2, and conventional tire, each having a tire size of 205/55R16 and a tire construction of FIG. 6, in which the tan delta at a temperature of 60° C. of coating rubber of the belt cover extension sections, the ratio h/SH of the tire radial-direction length h to the tire section height SH, and the tire axial-direction length of the parts of the belt cover extension sections extending from the edges of the first belt ply were as shown in Table 1.

In each test tire, the intersection C' of a normal line M drawn to the outer carcass ply from the edge C of the cap tread rubber layer with the carcass ply was located outwardly of the intersection Y' of a normal line N drawn to the outer carcass ply from the edge Y of the belt cover extension section with the carcass ply in the tire widthwise direction. Rubber the tan delta at a temperature of 60° C. of which was 0.2 was used as the rubber of the under tread rubber layer and wing chip rubber layer. The belt cover ply including the belt cover extension sections was structured such that strip members having nylon cords covered with rubber were adjacently wound with one edge of a strip member being butted against the other edge thereof to have a single layer.

The test tires were seated on 6JJ×15 sized rims, and inflated to air pressure of 200 kPa; evaluation testing for rolling resistance and uniformity was carried out according to the following measurement methods, obtaining the results shown in Table 1.

Rolling Resistance

Each test tire was mounted on a drum test machine with a drum diameter of 1707 mm; resistance force thereof was measured under conditions of a load of 4.6 kN and a speed of 80 km/h, and the measured resistance force was used as the rolling resistance. The obtained results were represented by an index where the conventional tire was 100. As the index is greater, rolling resistance is smaller, meaning that rolling resistance is further improved.

Uniformity

Each test tire was mounted on a uniformity measuring machine, and RFV (lateral force variation) thereof was measured under conditions of a load of 4.7 kN and a speed of 120 km/h. The obtained results were represented by an index where the conventional tire was 100. As the index is greater, uniformity is better.

TABLE 1

|  | Conventional Tire | Comparison Tire 1 | Present Invention Tire 1 | Comparison Tire 2 |
|---|---|---|---|---|
| Tan delta | 0.12 | 0.08 | 0.08 | 0.12 |
| h/SH | 1.6/100 | 1.6/100 | 1.4/100 | 1.4/100 |
| Extending Length (mm) | 10 | 12 | 12 | 12 |
| Rolling Resistance | 100 | 102 | 103 | 100 |
| Uniformity | 100 | 100 | 102 | 102 |

As can be seen from Table 1, the present invention tire can improve rolling resistance and uniformity.

EXAMPLE 2

Prepared were test tires according to the present invention tires 2 to 6, in each of which the tire construction, the tan delta at a temperature of 60° C. of coating rubber of the belt cover extension sections or the extension portions of the belt cover ply, the ratio h/SH, the length y, the position of the intersections C', and the tan delta at a temperature of 60° C. of rubber of the under tread rubber layer, wing chip rubber layer and belt edge cushion rubber layer were as shown in Table 2, each having the same tire size as in Example 1.

The belt cover ply of each test tire was structured such that strip members having reinforcing cords, formed of a nylon cord, covered with rubber were spirally wound in the tire circumferential direction, and each of the extension portions or belt cover extension sections was structured such that a strip member was adjacently wound in a partially superposed manner. The tire radial-direction length of the parts of the belt cover extension sections or extension portions of the belt cover ply of each test tire was 12 mm.

The test tires were subjected to evaluation testing for rolling resistance and uniformity as in Example 1, obtaining the results shown in Table 2.

TABLE 2

|  | Present Invention Tire 2 | Present Invention Tire 3 | Present Invention Tire 4 | Present Invention Tire 5 | Present Invention Tire 6 |
|---|---|---|---|---|---|
| Tire Construction | FIG. 6 | FIG. 2 | FIG. 2 | FIG. 2 | FIG. 2 |
| Tan Delta (1) | 0.08 | 0.08 | 0.08 | 0.08 | 0.08 |
| h/SH | 1.3/100 | 1.2/100 | 1.2/100 | 1.2/100 | 1.2/100 |
| Length y(mm) | 12 | 12 | 12 | 12 | 16 |

TABLE 2-continued

|  | Present Invention Tire 2 | Present Invention Tire 3 | Present Invention Tire 4 | Present Invention Tire 5 | Present Invention Tire 6 |
|---|---|---|---|---|---|
| Position of Intersections C' | Outward of Y' | Outward of A' | Inward of A' | Inward of A' | Inward of A' |
| Tan Delta (2) | 0.2 | 0.2 | 0.2 | 0.13 | 0.13 |
| Rolling Resistance | 106 | 105 | 107 | 108 | 108 |
| Uniformity | 102 | 101 | 101 | 101 | 104 |

Note:
In Table 2, Tan Delta (1) is the tan delta at 60° C. of coating rubber of the extension parts of the belt cover ply, and Tan Delta (2) is the tan delta at 60° C. of rubber of the under tread layer, wing chip rubber layers and belt edge cushion rubber layers.

As can be seen from Table 2, the present invention tires 2 and 3 in which the extension portions or belt cover extension sections are structured such that a strip member is adjacently wound in a partially superposed manner, can improve rolling resistance further than the present invention tire 1 not having a superposed structure.

The present invention tire 4 in which the intersection C' of a normal line M drawn to the carcass ply from the edge C of the cap tread rubber layer with the carcass ply is located inwardly of the intersection A' of a normal line N drawn to the carcass ply from the edge A of the extension portion with the carcass ply in the tire widthwise direction, can improve rolling resistance further than the present invention tire 3 having the same structure except that the intersection C' is located outwardly of the intersection A' in the tire widthwise direction.

The present invention tire 5 in which the tan delta at a temperature of 60° C. of rubber of the under tread layer, wing chip rubber layers and belt edge cushion rubber layers is lowered to be 0.13, can improve rolling resistance further than the present invention tire 4 having the same structure except that the tan delta is 0.2.

The present invention tire 6 in which the length y is made longer to be 16 mm can improve uniformity further than the present invention tire 5 having the same structure except that the length y is 12 mm.

INDUSTRIAL APPLICABILITY

The pneumatic tire of the present invention having the aforementioned excellent effects can be very effectively utilized as a pneumatic tire which is to be mounted on a vehicle, especially a passenger car.

What is claimed is:

1. A pneumatic tire comprising a carcass ply extending between beads,
    at least two belt plies being provided radially outwardly of the carcass ply in a tread, the at least two belt plies having reinforcing cords arranged obliquely with respect to a circumferential direction of the tire,
    a belt cover ply covering the at least two belt plies, the belt cover ply having a main belt cover section disposed radially outwardly of the at least two belt plies and belt cover extension sections separate from the main belt cover section and disposed radially inward and on each side of the main belt cover section, the main belt cover section having a reinforcing cord that extends in the circumferential direction of the tire and is covered with coating rubber, the belt cover extension sections extending beyond edges of one of the at least two belt plies having a maximum belt width, the belt cover extension sections extending more than 10 mm axially of the tire therefrom, the belt cover extension sections having reinforcing cords that extend in the circumferential direction of the tire and are covered with coating rubber,
    wherein the coating rubber of at least the belt cover extension sections of the belt cover ply is formed of rubber having a tan delta at a temperature of 60° C. that is equal to or less than 0.1, and a ratio h/SH of a tire radial-direction length h between outer edges of the belt cover extension sections and the edges of the belt ply having the maximum belt width to a tire section height SH is equal to or less than 1.5/100,
    wherein axially inner ends of the belt cover extension sections are disposed radially inward of one or more of the at least two belt plies and the belt cover extension sections are not attached to the main belt cover section, and
    wherein the tread has an under tread rubber layer placed radially outwardly of the belt cover ply, a cap tread rubber layer disposed radially outwardly of the under tread rubber layer, and wing chip rubber layers placed so as to cover opposite edges of each of the under tread rubber layer and cap tread rubber layer and the outer edges of the belt cover extension sections, an intersection C' of a normal line drawn to the carcass ply from the edge of the cap tread rubber layer with the carcass ply being located inwardly of an intersection A' of a normal line drawn to the carcass ply from the outer edge of the belt cover extension section with the carcass ply in the widthwise direction of the tire.

2. A pneumatic tire according to claim 1, wherein the belt cover ply is formed from strip members having the reinforcing cords covered with the coating rubber, the strip members being spirally wound in the circumferential direction of the tire, at least the belt cover extension sections being each formed such that a strip member is adjacently wound in a partially superposed manner.

3. A pneumatic tire according to claim 1, including belt edge cushion rubber layers disposed radially inwardly of edge portions of the at least two belt plies, the belt edge cushion rubber layers extending outwardly of the tire beyond the edge portions of the at least two belt plies, the belt cover extension sections being disposed on the belt edge cushion rubber layers.

4. A pneumatic tire according to claim 3, wherein the belt edge cushion rubber layers are formed of rubber having a tan delta at a temperature of 60° C. that is equal to or less than 0.15.

5. A pneumatic tire according to claim 1, including side rubber layers disposed outwardly of the carcass ply in sidewalls, the side rubber layers having radially outer end portions that extend to positions radially inward of edge portions of the at least two belt plies, the radially outer end portions being formed as belt edge cushion parts that are substantially triangular in cross section, the belt cover extension sections being disposed on the belt edge cushion parts.

6. A pneumatic tire according to claim 1, wherein the under tread rubber layer and the wing chip rubber layers are formed of rubber having a tan delta at a temperature of 60° C. that is equal to or less than 0.15, and that is 25% lower or more than that of rubber of the cap tread rubber layer.

7. A pneumatic tire according to claim 1, wherein the outer edges of the belt cover extension sections are spaced apart a distance of 10 mm or greater inwardly of the tire from radially inner edges of the wing chip rubber layers when measured parallel to the axial direction of the tire.

8. The pneumatic tire according to claim 1, wherein the tire is a passenger-car pneumatic tire.

9. The pneumatic tire according to claim 1, wherein the belt cover extension sections are disposed radially inward of an outermost one of the at least two belt plies.

10. The pneumatic tire according to claim 1, wherein the belt cover extension sections are disposed radially inward of the at least two belt plies.

\* \* \* \* \*